United States Patent [19]

Cuccio et al.

[11] 3,953,835
[45] Apr. 27, 1976

[54] METHOD AND APPARATUS FOR ADAPTING A DATA PROCESSING PORT TO RECEIVE AND TRANSMIT DIFFERENT FREQUENCY SIGNALS

[75] Inventors: Allen B. J. Cuccio; John P. Stafford, both of Oklahoma City, Okla.

[73] Assignee: Honeywell Information Systems, Inc., Waltham, Mass.

[22] Filed: Jan. 18, 1974

[21] Appl. No.: 435,136

[52] U.S. Cl. ............................................. 340/172.5
[51] Int. Cl.² ...................... G06F 3/04; G05B 1/08; G04F 3/08; G05B 19/28
[58] Field of Search ..................... 340/172.5; 445/1

[56] References Cited
UNITED STATES PATENTS

| | | | |
|---|---|---|---|
| 3,577,130 | 5/1971 | Rice et al. | 340/172.5 |
| 3,618,037 | 11/1971 | Wollum et al. | 340/172.5 |
| 3,623,010 | 11/1971 | Burkhalter | 340/172.5 |
| 3,639,913 | 2/1972 | Watson | 340/172.5 |
| 3,676,859 | 7/1972 | Hollaway et al. | 340/172.5 |
| 3,714,635 | 1/1973 | Hamilton et al. | 340/172.5 |
| 3,750,107 | 7/1973 | Pyne | 340/172.5 |
| 3,828,325 | 8/1974 | Stafford et al. | 340/172.5 |
| 3,833,888 | 9/1974 | Stafford et al. | 340/172.5 |

*Primary Examiner*—Raulfe B. Zache
*Assistant Examiner*—Jan E. Rhoads
*Attorney, Agent, or Firm*—Fred Jacob

[57] ABSTRACT

A control unit controls a data processing system port to communicate with different peripheral devices. The control unit determines the type of peripheral device that is being serviced and whether the port apparatus is transmitting or receiving data, and accordingly, activates a program to load a particular count into a counter. Upon reaching a specified count, the counter activates the control unit to control the sampling time of the incoming signal and to determine the interval of time or frequency of the transmitted data information signals.

5 Claims, 7 Drawing Figures

METHOD AND APPARATUS FOR ADAPTING A DATA PROCESSING PORT TO RECEIVE AND TRANSMIT DIFFERENT FREQUENCY SIGNALS

BACKGROUND OF THE INVENTION

This invention relates generally to data processing port apparatus and more particularly to a communication controller including a method and apparatus for adapting to different communication signal frequencies.

Since programmable terminals and peripherals today each have different operating parameters, data processing systems generally implement the programmable terminals and peripheral controllers by using an interface adapter designed especially for each terminal and/or controller to connect to the processing unit. The processing unit uses a single common interface standard to which all peripheral devices must adapt through the use of these special interface adapters. The interface adapter logic is unique to the peripheral device type. Each adapter logic samples the incoming signals from the peripheral device according to a timing device, generally a pulse delay circuit, and retransmits the received data information to the data processing system at the signal frequency required by the system. Similarly, on the transmit of data information, the data processing system sends the data information to the adapter which in turn buffers the data information and retransmits the data information at the frequency required by the peripheral device.

In the consideration of interface requirements for a general purpose controller, the first concept is to create a single common interface standard to which all peripheral devices must adapt through the use of special device interface electronics. However, if a single common interface is to be established, a fixed value for each of the parameters must be selected. Obviously, if this is done, many devices will have to be compromised because a common interface cannot be found which exactly suits all devices.

Prior Art

The prior art devices for sampling incoming information bit signals generally comprised timing circuits designed to operate at the frequency of the incoming signal. The frequency of these timing devices is not usually changeable while retaining frequency sampling characteristics. Thus each incoming signal that had a different frequency rate required a separate timing signal to sample the state of the information bit signals. Similarly to provide the different frequency rate required for transmitting data information signals, again separate timing devices were required for the transmission of the signals and further each peripheral device required a separate timing circuit if its required frequency rate was different from another peripheral device.

It is well-known in the prior art to use a counter-register as a timing device. It is not well-known to use a program controlled counter in a data processing system to control the sampling time of data information signals from different peripheral devices and to control the transmission interval or frequency rate of data information signals to different peripheral devices.

Thus what is needed is a method and apparatus which has universal frequency interfacing capabilities usable on data information signals both received and transmitted between a data processing system and its peripheral devices.

SUMMARY OF THE INVENTION

The method of receiving and transmitting different frequency signals between a data processor and peripheral devices according to the present invention provides the step of acknowledging an interrupt signal signifying the request of the peripheral device to gain access to the data processing system and identifying the peripheral requesting the service according to the received signal. On the next step, a start signal is prepared for according to the type of operation that is being performed and then a count is started from a specified number according to the peripheral device identified and the type of operation being performed. The starting count is incremented and when a specified count is attained, the data signal is operated on according to the type of operation being performed. The procedure continues to again start a count from the specified number unless a stop operation is indicated in which case the procedure ends.

On a receive cycle the data processor first awaits the receipt of a start signal. On a transmit cycle the data processor first prepares a start signal for transmission to the peripheral device. After the start signal the next step is to load a number into a Q counter according to the peripheral device identified and the type of operation, whether a receive or a transmit operation. The Q counter is then incremented until it reaches a specified count at which time the data processor operates on the data signal. The data signal from the peripheral device on a receive instruction is sampled and stored in the data processing system. The data signal from the data processor on a transmit instruction is activated and transmitted to the peripheral device. If the signal is a stop bit signal the process ends. If not, the process continues to again load a specific number into the Q counter, to increment the Q counter until the Q counter reaches a specified count, and to sample and store the next data signal received into the input/output port unit of the data processing system or to transmit the next data signal to the peripheral device. The process will continue in the circular mode until the stop bit is sensed to end the sampling of the incoming signal.

The apparatus to adapt a data processor to communicate with peripheral devices each using different frequency signals according to the present invention includes an input/output port unit for receiving the external interrupt signal and the data signals for transmission to the peripheral device or received from the peripheral device for use in the data processing system. The input/output port unit transmits the external interrupt signal to an interrupt address generator which identifies the peripheral device requiring access and also signals an instruction decode and execution unit to actuate a Q-counter register and a data store to transfer a number into the Q-counter according to the peripheral device identified. The instruction decode and execution unit then actuates the Q-counter until a specified count is obtained in the Q-counter. The Q-counter attaining the specified count actuates the instruction decode and execution unit. The instruction decode and execution unit in turn activates the data store to again set a specified number into the Q-counter register and also activates the inpupt/output port unit to either sample the incoming data at the specified time and to store the received data or to prepare one bit of information from a storage unit in the input/output port unit for transmission to the peripheral device. The time interval for sampling the received data information and the time interval between bits of information transmitted to the peripheral device is determined by the number placed into the Q-counter.

It is, therefore, an object of the present invention to provide an enhanced process and apparatus for adapting a data processing unit to communicate with a connecting peripheral device using any signal frequencies.

It is another object of the present invention to provide a program controlled apparatus that controls the sampling of data information from a signal and controls the transmission time intervals of a data signal.

It is yet another object to provide a program controlled apparatus which loads a counter according to the frequency of the data signal and type of operation and samples or transmits the data signal upon the counter reaching a specified count.

These and other objects of the present invention will become apparent to those skilled in the art as the description of the preferred embodiment proceeds.

BRIEF DESCRIPTION OF THE DRAWINGS

The various novel features of this invention, along with the foregoing and other objects, as well as the invention itself both as to its organization and method of operation, may be more fully understood from the following description of an illustrated embodiment when read in conjunction with the accompanying drawings, wherein.

DESCRIPTION OF THE PREFERRED EMBODIMENT

The counter-register according to the present invention provides interval timing on communications signals between a peripheral device and a data processing system containing the counter-register. The contents of the counter are modifiable under program control to provide a variable interval timing for the different frequencies of the signals as required by different peripheral devices.

Figure 1:
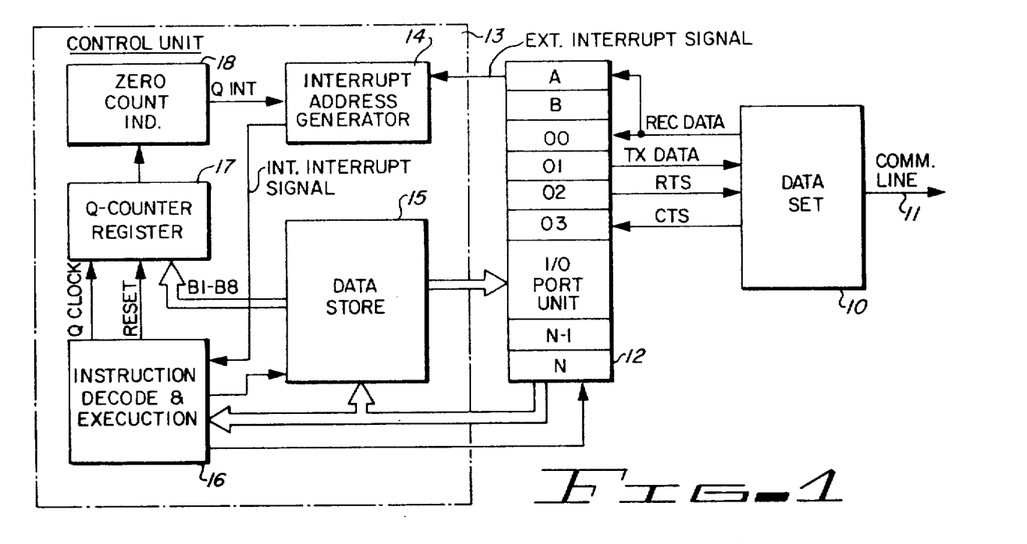
FIG. 1 is a block diagram of the portions of a data processing system usable to sample and transmit different frequency signals to a peripheral device.

As shown in FIG. 1, the variable frequency communication is for use with a data set 10 for instance, communicating with various peripheral devices (not shown) via a communications line 11. The data set 10 is connected into several ports of an input/output port unit 12 of the data processing system. The I/O port unit 12 directs data information signals into a control unit 13 of the data processing system, directs an external interrupt signal to an interrupt address generator 14 of the control unit 13 as received from the data set 10, receives data information from a data store 15 of the control unit 13, and receives instructions and commands from an instruction decode and execution unit 16 also in the control unit 13. The I/O port unit. 12, as with general port units, includes means for receiving the external interrupt signal from the peripheral device, port A, means for receiving data signals from one peripheral device, port 00 with storage devices (not shown), and means for storing data signals for transmission to one peripheral device, port 01 with storage devices (not shown). The interrupt address generator 14 takes the external interrupt signal and generates an internal interrupt signal which is directed to the instruction decode and execution unti 16. The interrupt address generator 14 senses that a peripheral device is requesting access to the data processing system and also generates signals identifying the type of peripheral device that is requesting the service to the instruction decode and execution unit 16.

The instruction decode and execution 16 controls the operation of the different parts of the data processing system. In response to the internal interrupt signal, the instruction decode and execution unit 16 actuates the data store unit 15 to transmit a binary number into a Q counter-register 17 according to the identification of the peripheral device. The instruction decode and execution unit 16 then actuates the generation of clocking signals, Q clock, to start the incrementing of the Q counter-register 17. At a certain count, in the preferred embodiment a zero count, a zero count indicator 18 is actuated by the Q counter, and a special interrupt QINT signal is generated and directed to the interrupt address generator 14. The interrupt address generator 14 then generates an internal interrupt signal to actuate the instruction decode and execution unit 16 which in turn actuates the I/O port unit 12 to either sample the received data signals from the data set 10 or to cause a transmission of data from the I/O port unit 12, depending upon whether a receive or transmit cycle is being performed.

Figure 2:
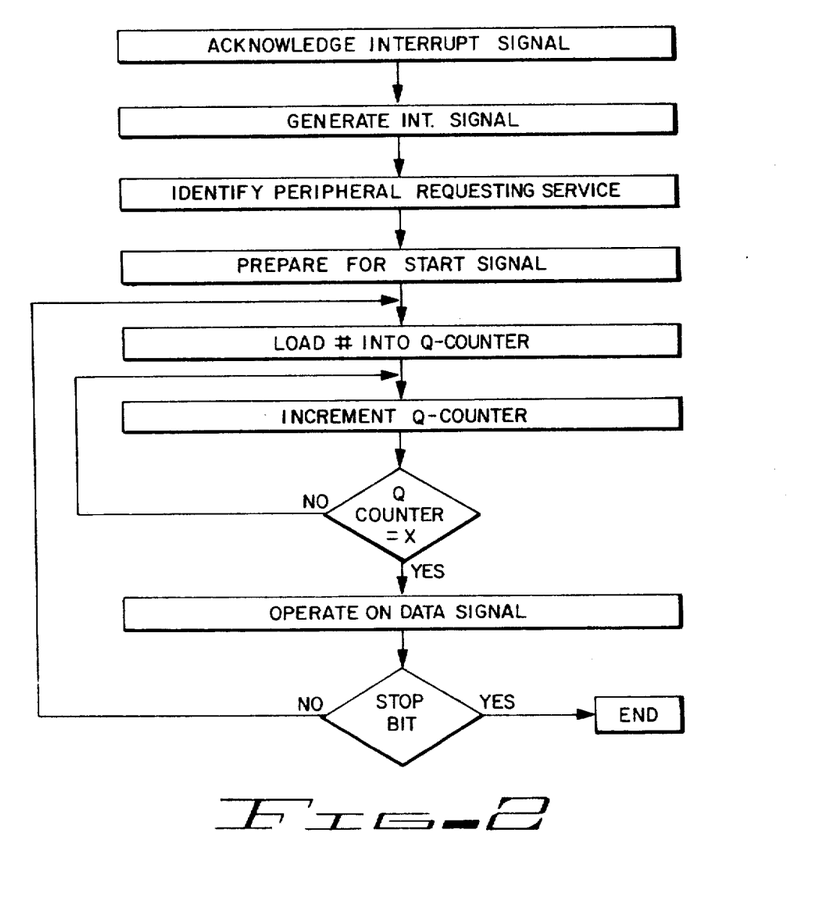
FIG. 2 is a flow diagram of the steps taken to operate with different frequency signals according to the present invention.

The method steps taken by the data processing system during the communication of data information are shown in FIG. 2. Thus the first step is to acknowledge that an interrupt signal has been transmitted by the peripheral device via the data set 10 to the I/O port unit 12. The interrupt signal signifies that the peripheral device is ready to communicate with the data processor to either transmit data information into the I/O port unit 12 for use by the data processing system or to receive data information from the I/O port unit 12. The next step in the method of operation in FIG. 2 is to generate the internal interrupt signal to activate the control unit to prepare for the incoming data information. The preparation includes identifying the peripheral requesting service and hence this information determines the binary number that is going to be placed into the Q counter unit 17. The next step is to prepare for a start signal. The start signal is inserted at the beginning of all communication to signify to the receiving device that data information follows. It is also possible to use the Q counter 17 to sense the start signal as will be discussed later in the more detailed flow chart of FIG. 5 and the timing chart of FIG. 6.

After the receipt of the start signal on a receive operation or the generation of a start signal on a transmit operation, the number designated by the peripheral device identification is placed into the Q counter 17 as a starting count. The difference between the starting count and the zero count of the present embodiment determines the time interval. The Q counter 17 is incremented by the Q clock signals provided by the instruction decode and execution unit 16. The flow continues in a circular manner until the Q counter 17 equals a specified number. At this time a Q interrupt signal is generated to operate on the data signal. On a receiving of data instruction, the sampling of the data signal is performed at the center of the occurrence of the data signal. On the instruction to transmit data information to the peripheral device, the data signal stored in the I/O port unit 12 is sampled to provide the change in signal level for the binary signal, either zero or one, see FIG. 6. If the signal being operated on is recognized as a stop bit the flow is ended, if not, the flow continues to load the number into the Q counter to prepare for the transmission or receipt of the next data signal.

Figure 3:
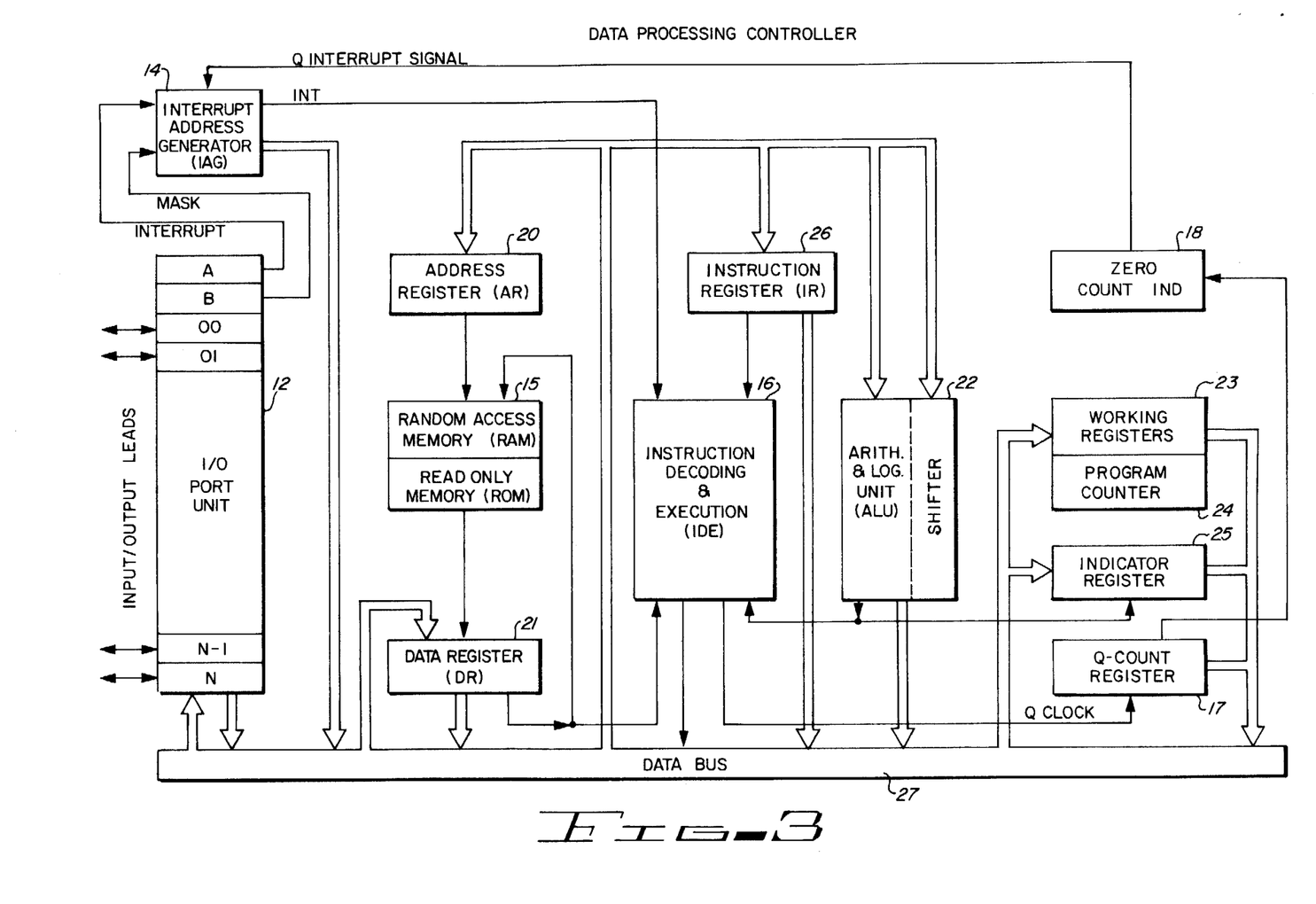
FIG. 3 is a block diagram of the entire controller showing the interconnection of the functional units of the data processing system.
Figure 4:
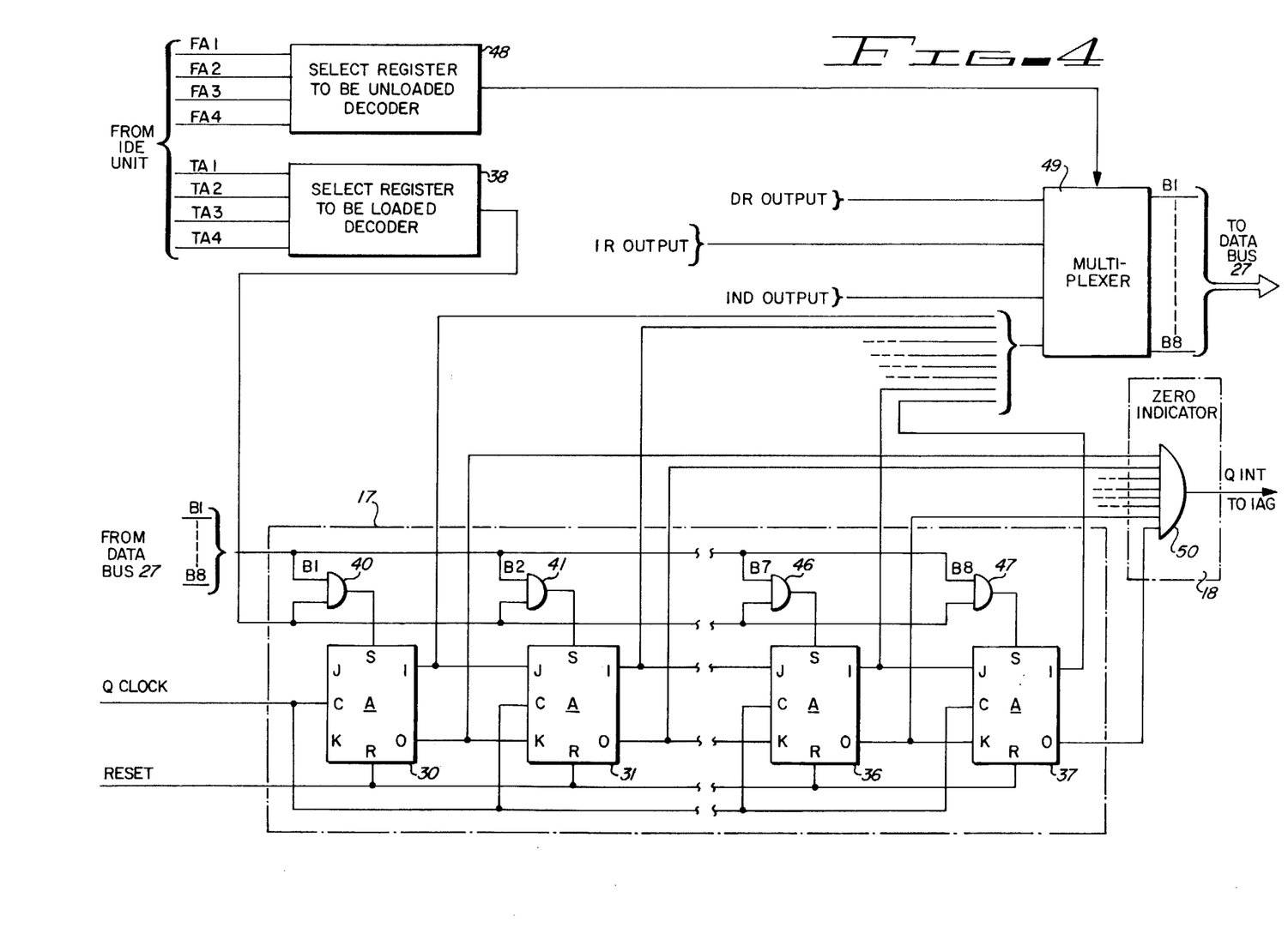
FIG. 4 is a block and logic diagram of the control of the registers of the data processor shown in FIG. 3 and the Q counter register shown in FIG. 1.
Figure 5A:
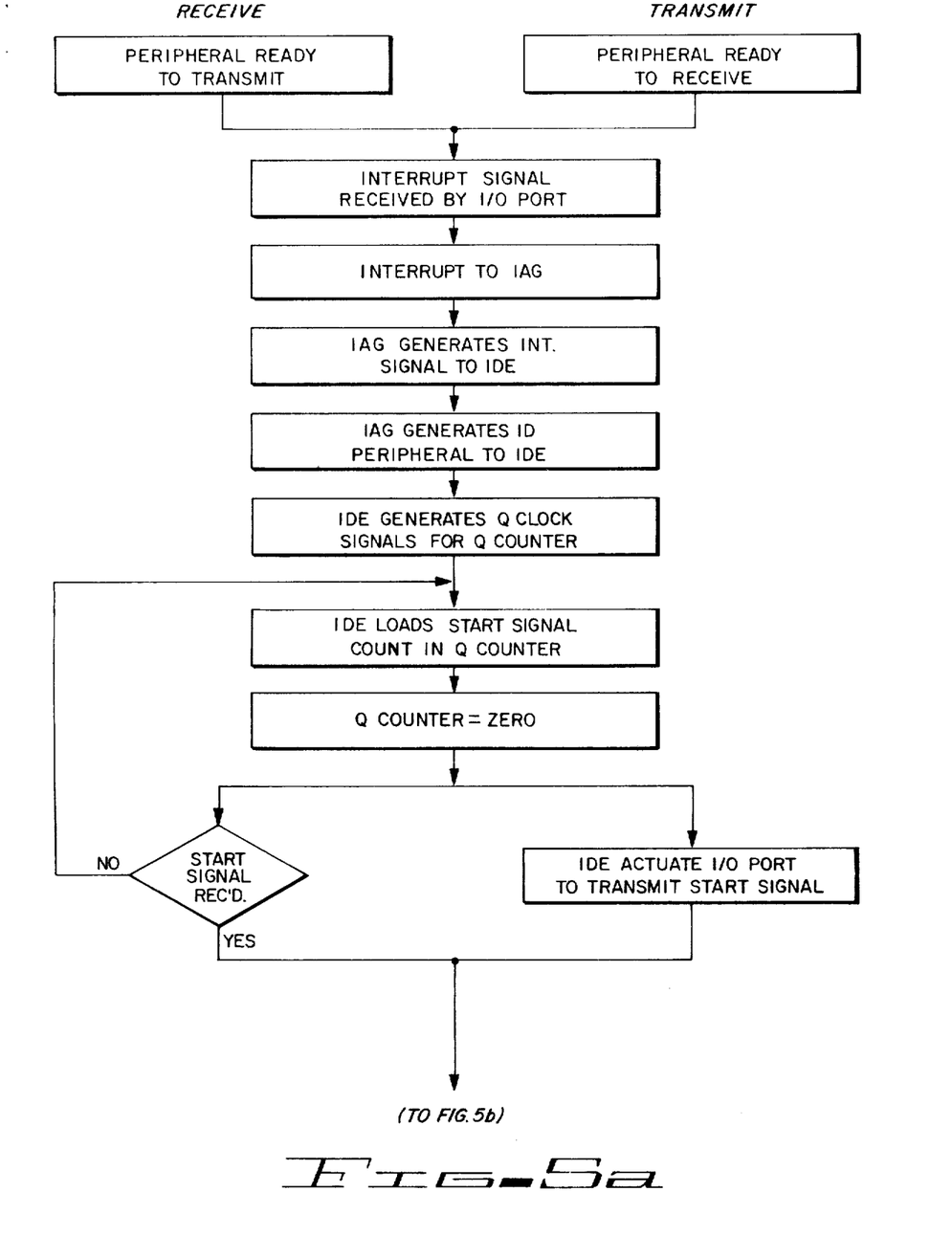
FIG. 5 is a flow diagram of the step taken by the data processing apparatus shown in FIG. 1 on the receiving of data information from a peripheral device and on a transmit of data information to a peripheral device.
Figure 5B:
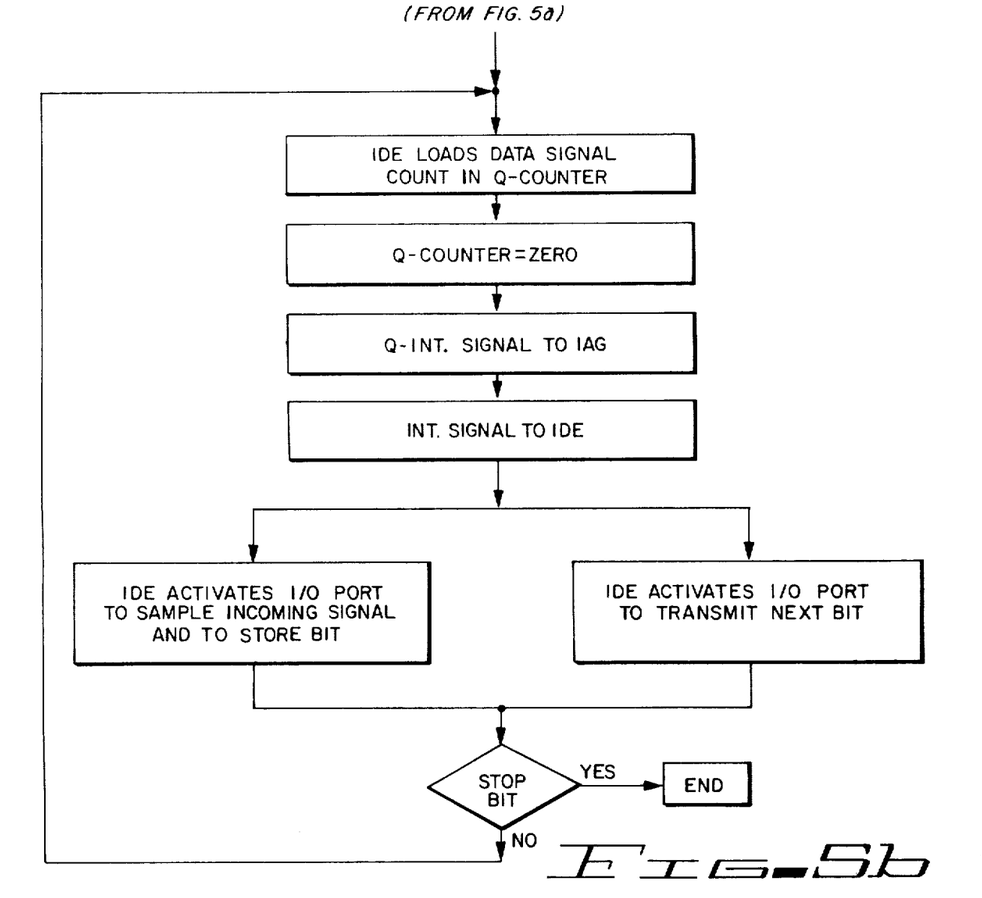

A block diagram of a data processing system for use with the present invention is shown in FIG. 3. A logic diagram of an embodiment of the Q counter register 17 according to the present invention is shown in FIG. 4. A more detailed flow diagram showing the interplay between the blocks of FIG. 1 for both a receive and a transmit instruction is shown in FIG. 5.

Referring now to FIG. 3, the controller of the data processing system includes: the input/output port unit 12 controlling the transmission of data to and from the terminal or peripheral device; the main memory data store 15 having a random access portion for storing variable data and instruction signals and a read only portion for storing fixed data and instruction signals; the interrupt address generator 14 responsive to requests for access signals emitted by the peripheral device to the input/output port unit 12 for interrupting the process being performed by the controller and generating an address to the data store 15 according to a preset priority scheme according to the identity of the peripheral device requesting access; an address register 20 for storing the address signals for the data store 15; a data register 21 for storing the data information signals from the data store 15; a combined arithmetic, logical and shifting unit 22; a plurality of working registers 23; a program counter 24; an indicator storage register 25; a special counter register, the Q counter 17; the instruction decode and execution unit 16 which includes a fast access read only memory store for constant instruction execution for controlling the operations of the different units of the data processing system; and an instruction register 26 storing the instructions from the data store 15 for altering the addressing of the constant instructions in the fast access read only memory store. All data and instruction signal distribution between units of the controller are by a single bidirectional data bus 27.

The data processing controller according to the preferred embodiment provides a universal interface to the peripheral devices. The instruction decode and execution unit 16, by executing instruction signals, controls the number of ports, controls the number and types of leads allocated to each peripheral device with the arithmetic and logical unit 22, and controls the pulse widths and signal frequency of the communicating signals with the program loadable Q counting register 17, the main object of the present invention. Reference is made to a copending U.S. Pat. application Ser. No. 329,491, filed on Feb. 5, 1973, now U.S. Pat. No. 3,828,325 and assigned to the same assignee as the present invention for a detailed explanation of the interface system according to the preferred embodiment.

The data processing controller further provides data manipulations such as storage, retransmission, arithmetic, logical, type indication and priority allotting of requests by the peripheral devices. The controller performs the data manipulations by distributing the instruction and data signals between all of the units on a single bus which transports signals to and from the unit. The instruction decode and execution unit 16 provides the control signal to control the functional unit relationship of the controller. Thus each functional unit will have all the required data and instruction signals supplied to it by the data bus. For a more detailed discussion of the digital data processing controller shown in FIG. 3 reference is made to a copending U.S. patent application Ser. No. 329,513, filed on Feb. 5, 1973, now U.S. Pat. No. 3,833,888 and assigned to the same assignee as the present invention. The present invention, by placing particular control programs in the data store, permits functional changeability of the pulse widths of transmitted data information and signal frequency of the received data information by the use of a program loadable counter-register.

Reference is now made to FIG. 4 for an embodiment of the Q counter 17 usable in the present invention. The Q counter 17 according to the preferred embodiment comprises a plurality of loadable single-bit storage elements, shown in FIG. 4 as a plurality of J-K flip-flops. The four J-K flip-flops 30–37 shown in FIG. 4 represent a group of eight bistables storing eight bits of information from the data bus, namely the B1–B8 data information signals. It is obvious that the Q counter 17 may be of any size and can comprise different types of loadable counter without departing from the scope of the present invention. The Q counter 17 shown is an incrementing counter and includes the zero indicator unit 18 which generates the Q interrupt signal to the interrupt address generator 14 when the Q counter reaches a zero count. It is also obvious that the indicator means, the zero indicator unit 18, can generate a Q interrupt signal on any count depending upon the interconnection of the indicator means with the Q counter 17. Therefore, the use of the Q counter as shown in FIG. 4 and the zero indicator circuitry should not be taken as limiting the present invention to the logic types shown.

The loading of the Q counter 17 as well as the other registers of the controller is controlled by the T0 address TA1-4 signals generated by the IDE unit 16 and transmitted to a select register to be loaded by decoder 38. The T0 signals select the register or registers that is to store the data information from the data bus 27. Thus if the Q counter 17 is to be loaded with the data signals on the data bus, selected T0 address signals are enabled to activate one input to a plurality of AND logical gates 40–47 having a second input connected to specific data signal leads from the data bus. Activating the AND-gates 40–47 via the loading decoder 38 causes the data signals on the data bus 27 to be inserted or "loaded" into the Q counter 17.

The FROM address FA1-5 signals from the IDE logic unit 16 control a select register to be unloaded decoder 48. The output signals from this decoder 48 control a multiplexer unit 49. The multiplexer unit 49 transfers the data information from the register selected according to the FROM address signals, to the data bus 27. Thus as shown, by selectively activating the FROM address signals, either the data register DR output signals, the instruction register IR output signals, the indicator register IND output signals, or the Q counter signals can be transmitted to the data bus. The internal operation of the Q counter 17 in particular the J-K flip-flops comprising the counter as shown in FIG. 4, can be obtained by referring to the text "Digital Design," by R. K. Richards, copyrighted 1971 by John Wiley & Sons, Inc., especially pages 151-4.

The operation of the Q counter 17 for the present invention is: first, the instruction decode and execution unit 16 resets all of the elements of the counter to a zero or low state. The reset signal when activated and directed to the R input of the individual J-K flip-flops causes all of the flip-flops to be placed into the reset or the "0" state without regard for the state of the J, C or K input terminals. Next, the loading decoder 38 is activated by the instruction decode and execution unit 16 according to the specific TO address signals required to activate the Q counter AND-gates 40-47. Activating the AND-gates 40-47 causes the data information on the data bus 27 to be directly inserted into the individual flip-flops of the Q counter by activating the set or S terminal of the flip-flops. Activating the S input terminal by an enabling signal causes the flip-flop to be placed into a set or "1" state, again regardless of the state of the J, C or K input terminals. Since the flip-flops were previously reset to a zero state, only a high or 1 data signal from data bus via the AND-gates 40-47 will cause a related flip-flop to change to a set state. The Q clock signals are then generated by the instruction decode and execution unit 16 causing the individual flip-flops of the Q-counter 17 to be incremented in a count fashion. After a period of time determined by the frequency of the Q clock signals and the signals loaded into the individual elements of the Q counter 17 along with the total number of elements in the Q counter 17, an AND-gate 50 of the zero indicator circuit 18 is activated. In the embodiment shown, the zero indicator circuit 18 is activated when all of the elements of the Q counter 17 reach a 0 state. At this time all of the inputs to the AND-gate 50 are in a high or enabled position which in turn enable the AND-gate 50 to generate a Q interrupt QINT signal. The QINT signal is transmitted to the interrupt address generator 14.

The use of a counter to time a certain event in a data processing system is well known. For instance, it is well known to use a counter-timer to generate an interrupt signal after a certain time period to prevent a high priority device from "hogging" or captivating all access time to a data processor. However, the use of a counter in a data processing system to time the sampling of incoming signals and to time the generation of transmitted data signals under program control by loading a number into the counter according to the type of operation and the identification of the peripheral device, is a major object of the present invention. The specific operation of the units of the data processing controller according to the present invention is given in FIG. 5.

Figure 6:
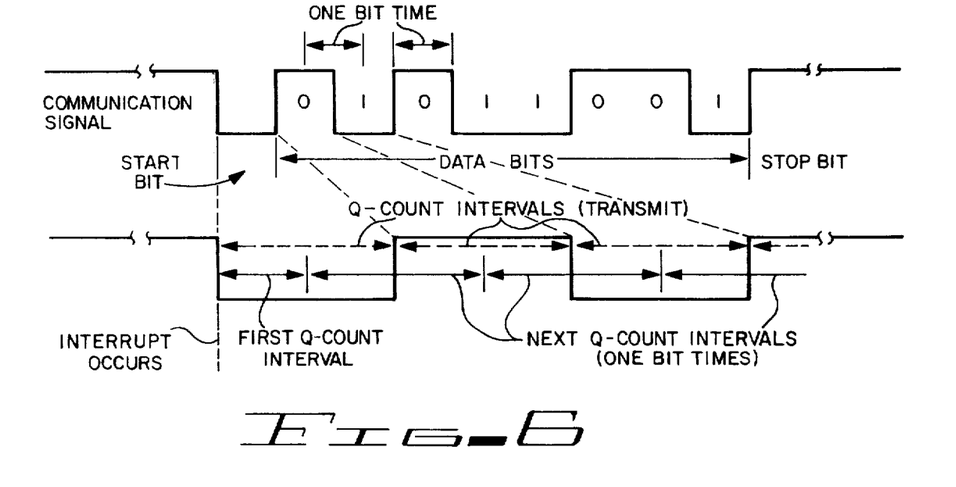
FIG. 6 is a timing chart showing the use of the Q-counter with a communication signal according to the frequency of the signal and the type of operation.

Referring now especially to FIG. 5 for the detailed flow chart of an operation, and to FIG. 1 for the interconnection of the units and FIG. 6 for the specific timing of an incoming signal, the first step is the decision whether the peripheral is ready for the operation. In FIG. 5 the steps of the flow referring only to a receive operation or instruction is shown on the left side of FIG. 5 while the flow steps on a transmit instruction only is shown on the right. Common operations to both a receive and transmit instruction are shown in the center of FIG. 5.

On a receive instruction, the signal that a peripheral is ready to transmit is the receipt by the data processing system of a start bit. In the present embodiment the I/O port unit 12 senses the beginning of the start bit and generates an interrupt signal when an incoming signal goes from a high or more positive signal to a low or less positive signal. The interrupt signal is received by the I/O port unit 12 which in turn generates an external interrupt signal to the interrupt address generator 14. The interrupt address generator 14 in turn generates an internal INT interrupt signal which is transmitted to the instruction decode and execution unit 16. The interrupt address generator 14 also generates an identification ID signal of the peripheral device to the instruction decode and execution unit 16.

The instruction decode and execution unit 16 generates the Q clock signals for the Q counter 17 and also loads the start signal count number into the Q counter 17. The start signal count in the Q counter provides the timing for the first Q count interval, see FIG. 6, of the incoming signal. The first Q count interval provides a time interval to the center of the start bit signal.

When the Q counter 17 reaches a zero count, the zero count indicator 18 generates a Q interrupt QINT signal which eventually samples and senses the start bit signal on the receive instruction being performed. The receipt of the start signal signifies to the data processing system that the next group of information is the data information signal. The instruction decode and execution unit 16 then loads a number in the Q counter 17 according to the frequency of the data signals. This number as with all others loaded into the Q counter 17 is obtained from the data store 15 under program control. The program is identified by the interrupt address generator 14 from the peripheral device requiring service. As shown in FIG. 6 the next required time interval is from the center of the start signal to the center of the next signal. The next Q count interval is equal to the time period of one bit signal. Succeeding Q count intervals provide a sensing of all succeeding data information signals at approximately the center of the data information signals. The sensing of the data information signals is accomplished when the Q counter 17 reaches a zero count and the zero count indicator 18 generates the Q INT signal which is transmitted to the interrupt address generator 14. The interrupt address generator 14 in response to the QINT signal generates another interrupt signal to the instruction decode and execution unit 16. The instruction decode and execution unit 16 activates the I/O port unit 12 to sample the incoming signal and to store the bit in the register in the I/O port unit 12. The flow then senses whether the bit transferred is the stop bit information. The stop bit in the preferred embodiment will occur after eight data information bits are either received or transmitted. If the information bit signal is not a stop bit the flow continues to reload the Q counter 17 and again increments the Q counter to sample the next data information signal.

On a transmit instruction, the steps are approximately the same except that instead of sampling the signals at their intermediate position, the Q count intervals counts the one bit signal interval of time during which time the I/O port unit 12 transmits that data signal from the internal register of the I/O port unit 12. Before transmitting the signal, the data processor prepares for the transmit by causing the data information to be transferred from the data store 15 to the I/O port unit 12 awaiting the final transmission of data to the data set 10 and via the communications line 11 to the peripheral device. The I/O port unit 12 transmits a ready-to-send RTS signal to the data set. The peripheral device, if ready to receive data information, responds by generating an interrupt signal which is received by the I/O port unit 12. The I/O port unit 12 in turn transmits an external interrupt signal to the interrupt address generator 14. The interrupt address generator 14 then generates an internal interrupt signal to the instruction decode and execution unit 16 along with an identification signal of the peripheral device. The instruction decode and execution unit 16 generates the Q clock signals for the Q counter 17 and loads a binary number in the Q counter equal to the frequency of the start signal. When the Q counter 17 reaches the zero count, the instruction decode and execution unit 16 actuates the I/O port unit 12 to transmit the start signal, see FIG. 6.

Still referring to FIG. 5, the next step is that the instruction decode and execution unit 15 loads the count of the data signals in the Q counter 17. The instruction decode and execution unit 16 also actuates the I/O port unit 12 to transmit the first bit signal. When the Q counter 17 reaches the count of zero and the zero count indicator circuit 18 is activated to generate the QINT signal to the interrupt address generator 14, the instruction decode and execution unit 16 is activated by the INT signal from the interrupt address generator 14.

The instruction decode and execution unit 16 activates the I/O port unit 12 to end the transmission of the present data information bit signal and to start the transmission of the next bit signal. The flow then checks to see if the data information signal being transmitted is a stop bit and if it is the flow is ended. If it is not a stop bit signal the flow continues to have the instruction decode and execution unit 16 reload the Q counter 17 and start the count for determining the interval of time for the transmission of the data information signal and thereby determine the frequency of the transmission.

The number placed into the Q counter 17 depends upon the time interval required. In the present embodiment, the time taken by the Q counter 17 to reach a zero count from the entered binary number must be equal to the time interval required. The time taken by the Q counter depends upon the type, such as size, of the Q counter and the frequency of the Q clock signals. It is well within the capability of a person skilled in the electronics art to obtain the programmed number to insert into the counter knowing the time interval required, the size of the counter, the frequency of the clocking signals and the number that the counter must reach to cause the generation of an activation signal. Further the means for retrieving this number from the data store under program control is likewise well known in the art.

Thus what has been shown is the usage of a loadable counter to control the pulse width and signal frequency of the data information signals being received or transmitted by the input/output port unit. While the principles of the invention have now been made clear in an illustrated embodiment, there will be obvious to those skilled in the art many modifications of structure, arrangements, proportion, the elements, materials and components used in the practice of the invention, and otherwise, which are particularly adapted for specific environments and operating requirements without departing from these principles. The appended claims are, therefore, intended to cover and embrace any such modifications, with limits only of the true spirit and scope of the invention.

We claim:

1. Apparatus for adapting a data processor to communicate in real time with peripheral devices respectively using different frequency signals in a receive or a transmit mode comprising:

an input/output port unit for receiving an external interrupt signal from one of said peripheral devices requesting communication, for receiving data signals from said one peripheral device, and for storing data signals for transmission to the one peripheral device;

an interrupt address generator connected to said input/output port unit for generating an identification signal of said one peripheral device and an interrupt signal in response to the receipt by said input/output port unit of the external interrupt signal;

an addressable data store;

a loadable counter; and an instruction decode and execution unit connected to receive identification and internal interrupt signals and responsive thereto to access said data store to retrieve a number stored in an address location according to the identification signal and the mode of communication, and to transfer said retrieved number into said counter and activate said counter;

said counter being coupled for actuation of said interrupt address generator upon attaining a specified count to generate subsequent internal interrupt signals;

said instruction decode and execution unit being coupled to actuate said input/output port unit to receive the data signals on a receive communication in response to the subsequent internal interrupt signals or to transmit the stored data signals in response to all internal interrupt signals.

2. In a data processor including: an input/output port unit having first means for receiving an external interrupt signal from peripheral devices requesting communication in a receive or a transmit mode, second means for receiving data signals from one peripheral device, and third means for storing data signals for transmission to one peripheral device; an interrupt address generator connected to said input/output port unit for generating an identification signal of said one peripheral device and an internal interrupt signal in response each time to the first means receiving the external interrupt signal; an addressable data store; and an instruction decode and execution unit connected to receive each identification signal and all internal interrupt signals; wherein the data processor is adaptable for communicating with peripheral devices each using different frequency signals and further comprises:

a loadable counter;

said data store storing numbers in addressable locations according to the mode of communication, identification of the peripheral device requesting communication and the data signal;

said instruction decode and execution unit accessing said data store in response to said identification signals, the type of communications being performed and internal interrupt signals, and transferring a retrieved number from said data store to said counter, and activating said counter;

said counter being coupled for actuation of said interrupt address generator upon attaining a specified count to generate subsequent internal interrupt signals;

said instruction decode and execution unit being coupled to actuate said second means to receive the data signals on a receive communication in response to the subsequent internal interrupt signals, or actuating said third means to transmit the stored data signals in response to all internal interrupt signals.

3. A method of adapting a data processor to communicate in real time in a receive or transmit operation respectively with peripheral devices each using different frequency signals comprising:
 a. receiving a signal from one peripheral device signifying a request for access to the data processor;
 b. identifying the one peripheral device requesting access according to said received signal;
 c. starting a count from a number specified according to the one peripheral device identified;
 d. incrementing the started count;
 e. operating on the data signal when a specified count number is attained according to the type of said operation being performed;
 f. going to step (g) if a stop operation is indicated from the operated on data signal, otherwise going to step (c); and
 g. ending communication with the one peripheral device.

4. A method of adapting a data processor to receive in real time different frequency signals from different peripheral devices comprising:
 a. receiving a signal from one peripheral device signifying a request for access to the data processor;
 b. identifying the one peripheral device requesting service according to the received signal;
 c. loading a number into a counter corresponding to the one peripheral device identified;
 d. incrementing the counter;
 e. sensing the signal being received from the one peripheral device when the counter reaches a specified count;
 f. ending the process if a start signal is not sensed otherwise going to step (g);
 g. loading a number into a counter corresponding to the peripheral device identified;
 h. incrementing the counter;
 i. sensing the data signal being received from the peripheral device when the counter reaches a specified count;
 j. storing the sensed data signal;
 k. going to step (l) if a stop operation is indicated by the stored signal otherwise going to step (g); and
 l. ending communication with the one peripheral device.

5. A method of adapting a data processor to transmit in real time different frequency signals to different peripheral devices comprising:
 a. receiving a signal from one peripheral device signifying a request for access to the data processor;
 b. identifying the one peripheral device requesting service according to the received signal;
 c. transmitting a data signal to the one peripheral device;
 d. loading a number into a counter corresponding to the frequency of the one peripheral device identified;
 e. incrementing the counter;
 f. sensing the next data signal to be transmitted to the one peripheral device when the counter reaches a specified count;
 g. going to step (h) if a stop data signal is sensed otherwise going to step (c) to transmit said next data signal;
 h. transmitting a stop signal to the one peripheral device; and
 i. ending the transmittal of data signals to the one peripheral device.

* * * * *